(12) United States Patent
Ogawa

(10) Patent No.: US 7,208,913 B2
(45) Date of Patent: Apr. 24, 2007

(54) ELECTRONIC DEVICE WITH BATTERY TYPE AND AMBIENT TEMPERATURE DETECTION

(75) Inventor: Katsunori Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 10/475,521

(22) PCT Filed: Jan. 24, 2003

(86) PCT No.: PCT/JP03/00644

§ 371 (c)(1),
(2), (4) Date: Nov. 3, 2003

(87) PCT Pub. No.: WO03/075088

PCT Pub. Date: Sep. 12, 2003

(65) Prior Publication Data

US 2004/0135540 A1    Jul. 15, 2004

(30) Foreign Application Priority Data

Mar. 5, 2002   (JP) .............................. 2002-058337

(51) Int. Cl.
*H02J 7/00* (2006.01)
(52) U.S. Cl. ...................................... 320/114; 320/106
(58) Field of Classification Search ................ 320/106, 320/110, 112, 114; 324/431; 354/468
See application file for complete search history.

(56) References Cited

U.S. PATENT DOCUMENTS

| | | | |
|---|---|---|---|
| 4,866,471 A | 9/1989 | Ikuta | |
| 5,557,365 A | 9/1996 | Ohsawa | |
| 5,912,544 A * | 6/1999 | Miyakawa et al. | 320/106 |
| 5,926,659 A | 7/1999 | Matsui | |
| 6,064,176 A | 5/2000 | Odaka | |
| 6,064,181 A * | 5/2000 | Sanada et al. | 320/132 |
| 6,069,449 A * | 5/2000 | Murakami | 315/158 |

FOREIGN PATENT DOCUMENTS

| | | |
|---|---|---|
| JP | 62-223739 | 10/1987 |
| JP | 1-263630 | 10/1989 |
| JP | 2-66533 | 3/1990 |
| JP | 5-333408 | 12/1993 |

(Continued)

*Primary Examiner*—Adolf Denake Berhane
*Assistant Examiner*—Aaron Piggush
(74) *Attorney, Agent, or Firm*—Frommer Lawrence & Haug LLP; William S. Frommer; Thomas F. Presson

(57) ABSTRACT

The present invention relates to an electronic device and a control method, in which operating conditions can be changed according to the type of battery. A CPU 41 reads from a memory a corresponding zoom speed set value, a brightness set value, or a strobe charging time set value according to the type of battery, supplied from a battery type determination mechanism 12, a detected voltage of the battery, supplied from a battery voltage detection section 81, and a detected ambient temperature of the battery, supplied from a temperature detection section 91. Based on these set values, the CPU 41 controls the zoom speed of the zoom mechanism 45, controls the brightness of a display screen 62, and controls the strobe charging time of a strobe mechanism 72. The present invention can be applied to an imaging device driven by a battery.

5 Claims, 15 Drawing Sheets

FOREIGN PATENT DOCUMENTS

| | | |
|---|---|---|
| JP | 6-89794 | 3/1994 |
| JP | 08-328701 | 12/1996 |
| JP | 10-073866 | 3/1998 |
| JP | 10-255623 | 9/1998 |
| JP | 10-268392 | 10/1998 |
| JP | 11-84462 | 3/1999 |
| JP | 2000-10159 | 1/2000 |
| JP | 2000-56370 | 2/2000 |
| JP | 2000-222081 | 8/2000 |
| JP | 2000-241860 | 9/2000 |
| JP | 2000-347255 | 12/2000 |
| JP | 2001-85070 | 3/2001 |
| JP | 2002-40532 | 2/2002 |
| JP | 2002-043958 | 2/2002 |
| JP | 2002-300470 | 10/2002 |
| JP | 2002-344794 | 11/2002 |
| JP | 2003-60977 | 2/2003 |

* cited by examiner

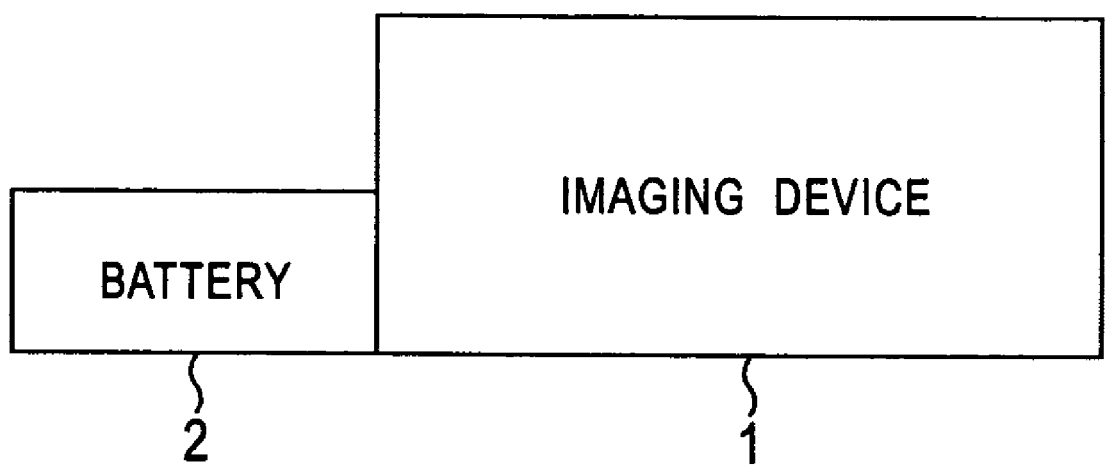

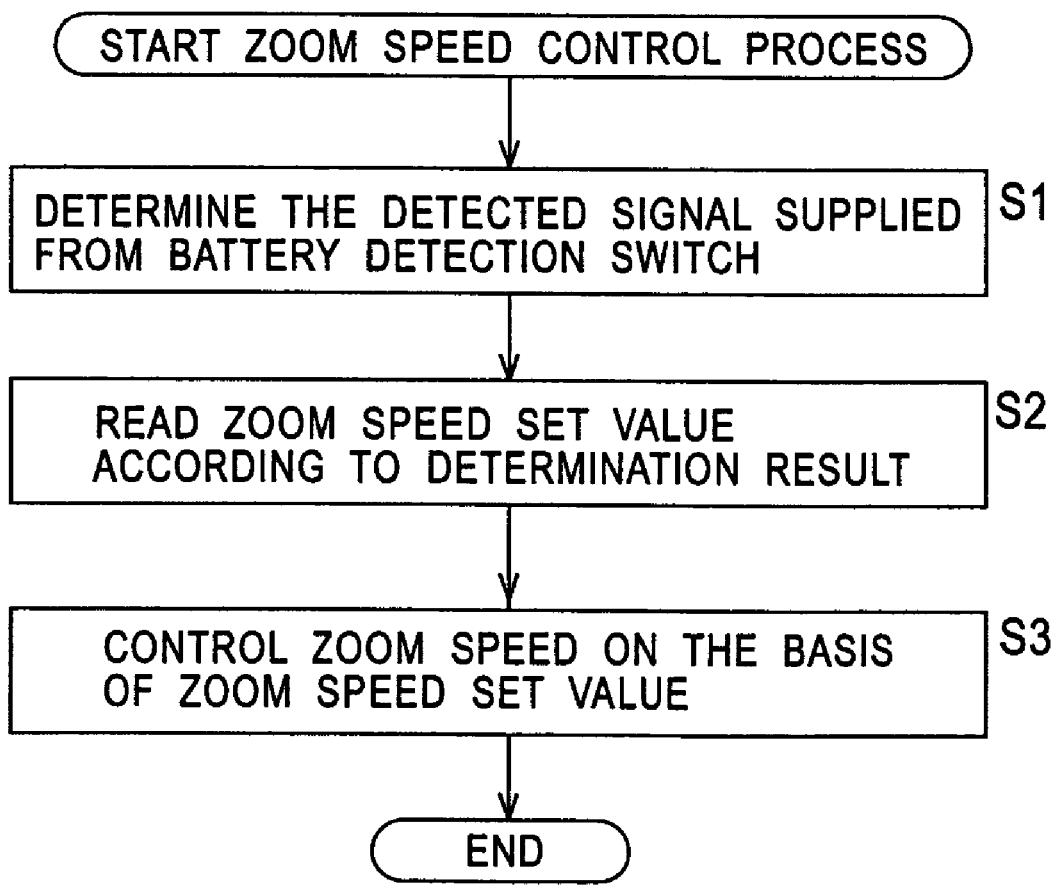

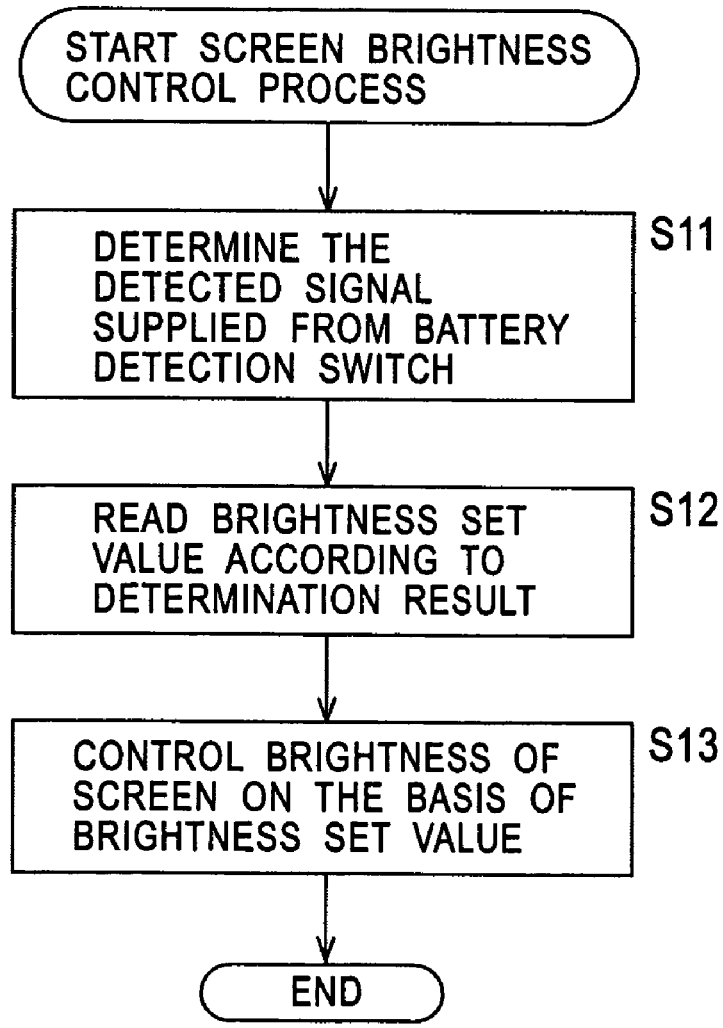

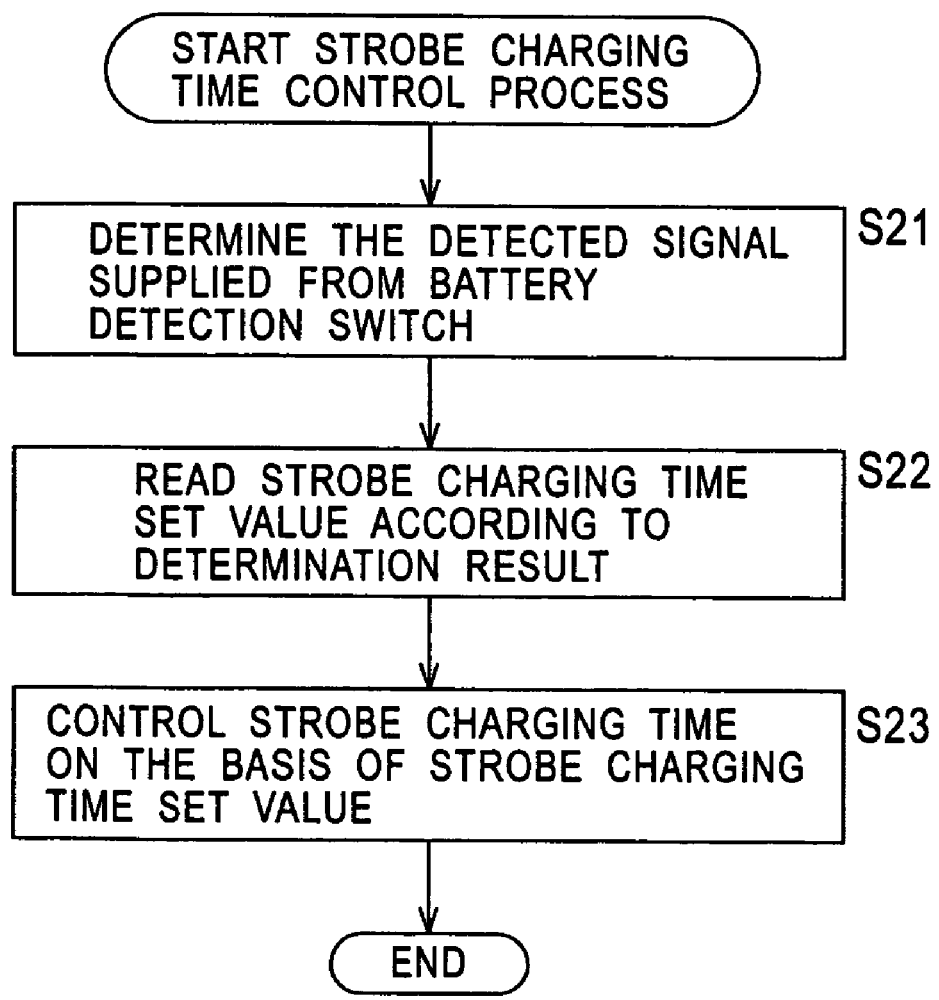

| DETECTED SIGNAL | DETECTED VOLTAGE Vbatt | STROBE CHARGING TIME SET VALUE (SECONDS) |
|---|---|---|
| OFF | Vbatt ≧ Vth | D1 |
| OFF | Vbatt < Vth | D2 |
| ON | Vbatt ≧ Vth | D3 |
| ON | Vbatt < Vth | D4 |

FIG. 17

| DETECTED SIGNAL | DETECTED VOLTAGE Vbatt | DETECTED TEMPERATURE T | STROBE CHARGING TIME SET VALUE (SECONDS) |
|---|---|---|---|
| OFF | Vbatt ≧ Vth | T ≧ Tth | E1 |
| OFF | Vbatt ≧ Vth | T < Tth | E2 |
| OFF | Vbatt < Vth | T ≧ Tth | E3 |
| OFF | Vbatt < Vth | T < Tth | E4 |
| ON | Vbatt ≧ Vth | T ≧ Tth | E5 |
| ON | Vbatt ≧ Vth | T < Tth | E6 |
| ON | Vbatt < Vth | T ≧ Tth | E7 |
| ON | Vbatt < Vth | T < Tth | E8 |

ELECTRONIC DEVICE WITH BATTERY TYPE AND AMBIENT TEMPERATURE DETECTION

TECHNICAL FIELD

The present invention relates to an electronic device and a control method. More particularly, the present invention relates to an electronic device and a control method, which control a predetermined operation, for example, according to the type of battery loaded into the electronic device.

BACKGROUND ART

Hitherto, in battery-driven electronic devices in which two AA size batteries are power sources, various types of batteries can be used.

In the case of an AA size battery, for example, two alkali batteries, two nickel primary batteries, or two nickel secondary batteries can be used. In the case of a box-type battery, for example, a lithium primary battery or a lithium secondary battery can be used.

However, there is a large difference in the power capacities and the characteristics of these batteries. For example, between two alkali AA size batteries and a lithium secondary battery, there is a large difference in the power capacities, the impedance at low-temperature time, and impedance characteristics when the battery voltage is decreased.

More specifically, in spite of the fact that the difference in the characteristics of batteries is large, current battery-driven electronic devices always operate under the same conditions irrespective of the type of battery. For this reason, even with a battery of a high capacity and a low impedance like a lithium primary battery, there are problems in that the potential thereof cannot be fully exploited.

DISCLOSURE OF THE INVENTION

The present invention has been made in view of such circumstances, and aims to be able to change the operating conditions of an electronic device according to the type of battery.

The electronic device of the present invention includes obtaining means for obtaining a signal for identifying the type of battery, which is supplied from the power supply unit; determination means for determining the type of battery on the basis of the signal obtained by the obtaining means; and control means for controlling a predetermined operation of the electronic device on the basis of the determination result by the determination means.

The control means may perform control so that at least one of the zoom speed of the electronic device, the brightness of the screen of the electronic device, and the strobe charging time of the electronic device is changed.

The electronic device may further include voltage detection means for detecting the voltage of the voltage the battery, which is supplied from the power supply unit, wherein the control means may control a predetermined operation of the electronic device on the basis of the determination result by the determination means and the voltage detection result by the voltage detection means.

The electronic device may further include temperature detection means for detecting the ambient temperature of the battery, which is supplied from the power supply unit, wherein the control means may control a predetermined operation of the electronic device on the basis of the determination result by the determination means and the temperature detection result by the temperature detection means.

The electronic device may further include voltage detection means for detecting the voltage of the battery, which is supplied from the power supply unit; and temperature detection means for detecting the ambient temperature of the battery, which is supplied from the power supply unit, wherein the control means may control a predetermined operation of the electronic device on the basis of the determination result by the determination means, the voltage detection result by the voltage detection means, and the temperature detection result by the temperature detection means.

The electronic device may further include storage means for storing condition information for controlling the predetermined operation, wherein the control means may read the condition information stored in the storage means on the basis of the determination result by the determination means, and may control a predetermined operation of the electronic device on the basis of the read condition information.

The control method of the present invention includes an obtainment control step of controlling the obtainment of a signal for identifying a type of battery, which is supplied from the power supply unit; a determination step of determining the type of battery on the basis of the signal whose obtainment is controlled in the process of the obtainment control step; and a control step of controlling a predetermined operation of the electronic device on the basis of the determination result in the process of the determination step.

The program recorded on a recording medium of the present invention includes an obtainment control step of controlling the obtainment of a signal for identifying a type of battery, which is supplied from the power supply unit; a determination step of determining the type of battery on the basis of the signal whose obtainment is controlled in the process of the obtainment control step; and a control step of controlling a predetermined operation of the electronic device on the basis of the determination result in the process of the determination step.

The program of the present invention allows a computer to execute: an obtainment control step of controlling the obtainment of a signal for identifying a type of battery, which is supplied from the power supply unit; a determination step of determining the type of battery on the basis of the signal whose obtainment is controlled in the process of the obtainment control step; and a control step of controlling a predetermined operation of the electronic device on the basis of the determination result in the process of the determination step.

In the electronic device, the control method, and the program of the present invention, a signal for identifying the type of battery, which is supplied from the power supply unit, is obtained. Based on the obtained signal, the type of battery is determined, and based on the determination result, a predetermined operation of the electronic device is controlled.

BRIEF DESCRIPTION OF THE DRAWINGS

FIG. 1 shows an example of a connection between an imaging device and a battery according to the present invention.

FIG. 5 shows an example of a table of zoom speed set values recorded in a memory of FIG. 4.

FIG. 6 is a flowchart illustrating a zoom speed control process performed by the imaging device of FIG. 4.

FIG. 8 shows an example of a table of brightness set values recorded in a memory of FIG. 7.

FIG. 9 is a flowchart illustrating a screen brightness control process performed by the imaging device of FIG. 7.

FIG. 11 shows an example of a table of strobe charging time set values recorded in a memory of FIG. 10.

FIG. 12 is a flowchart illustrating a strobe charging time control process performed by the imaging device of FIG. 10.

FIG. 17 shows an example of a table of strobe charging time set values recorded in a memory 42 of FIG. 16.

BEST MODE FOR CARRYING OUT THE INVENTION

Figure 2A:
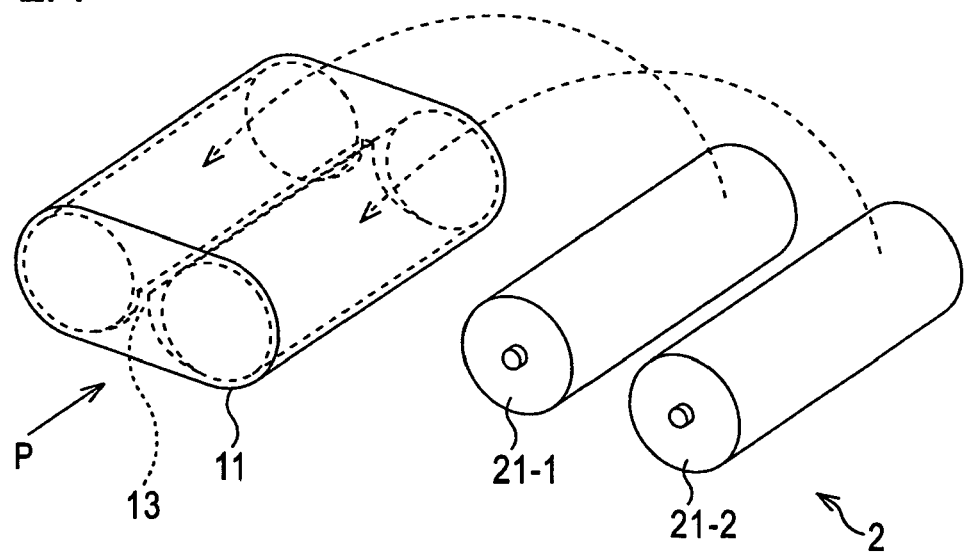
FIG. 2A shows an example of the configuration of a battery.

Embodiments of the present invention will now be described below with reference to the drawing.

FIG. 1 shows an example of a connection between an imaging device 1 and a battery 2 according to the present invention.

The imaging device 1 is an imaging device formed by, for example, a still camera, a digital camera, or a camcorder. According to the battery type of the loaded battery 2, the imaging device 1 causes the zoom speed of a zoom mechanism 45 (FIG. 4), the brightness of a display screen 62 (FIG. 7), or the strobe charging time of a strobe mechanism 72 (FIG. 10) to be changed.

The battery 2, as shown in FIG. 1, is loaded into a loading section (not shown) of the imaging device 1, and supplies electrical power to the imaging device 1.

Figure 2B:
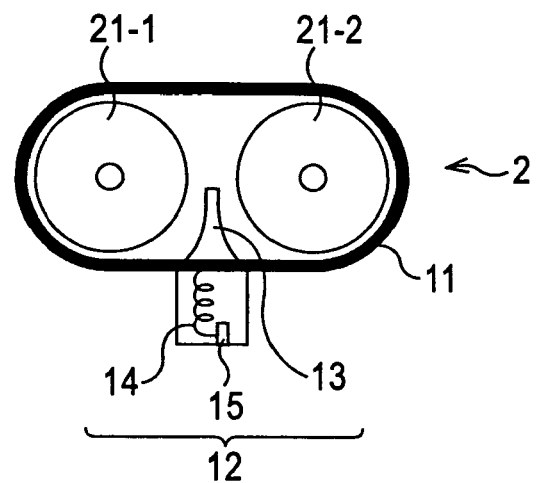
FIG. 2B shows an example of the configuration of a battery.

FIGS. 2A and 2B show an example of the configuration of the battery 2. FIG. 2A shows an exterior perspective view of the battery 2, and FIG. 2B shows a side sectional view viewed from the direction of an arrow P of FIG. 2A.

The battery 2 is formed of a battery box 11 (battery housing mechanism) for housing batteries 21-1 and 21-2, and a battery type determination mechanism 12 for determining the type of battery. The battery type determination mechanism 12 is further formed of a movable sill 13, a spring 14, and a battery detection switch 15.

The movable sill 13 is supported by the spring 14 and is movable downwards in FIG. 2B. The battery detection switch 15 is connected to the movable sill 13 via the spring 14. Although the battery detection switch 15 is usually in an off state, when the movable sill 13 is moved downwards, the spring 14 expands or contracts, exerting a force (urging force) for pressing the battery detection switch 15. In this manner, the battery detection switch 15 is turned on by using the urging force of the spring 14. The battery detection switch 15 supplies a switch on/off (ON/OFF) signal to the imaging device 1.

The AA size batteries 21-1 and 21-2 are formed of alkali batteries, a nickel primary battery, or a nickel secondary battery and are housed in the battery box 11, as indicated by the dotted-line arrows of FIG. 2A. In this case, since the AA size batteries 21-1 and 21-2 are housed in the battery box 11 with the movable sill 13 in between, the movable sill 13 is not moved downwards in FIG. 2B. That is, when the AA size batteries 21-1 and 21-2 are housed in the battery box 11, the battery detection switch 15 remains off.

Figure 3A:
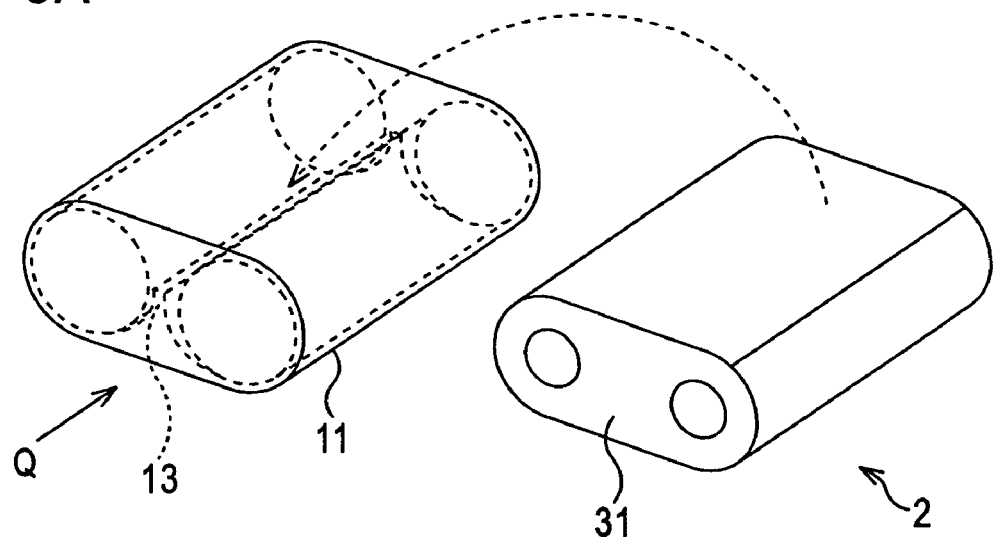
FIG. 3A shows another example of the configuration of a battery.
Figure 3B:
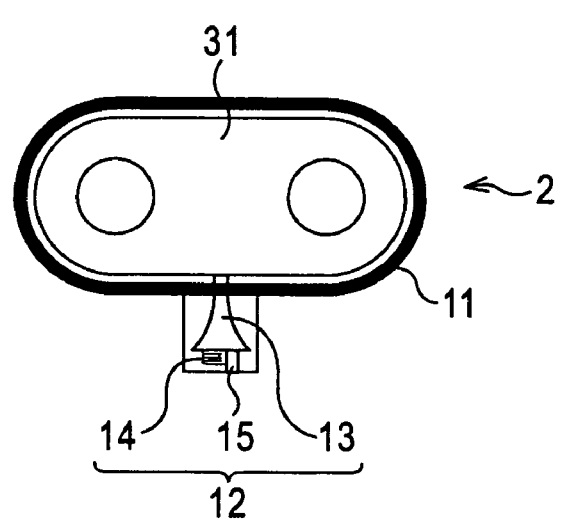
FIG. 3B shows another example of the configuration of a battery.

FIGS. 3A and 3B show another example of the configuration of the battery 2. FIG. 3A shows an exterior perspective view of the battery 2, and FIG. 3B shows a side sectional view viewed from the direction of an arrow Q of FIG. 3A. Components in FIGS. 3A and 3B, which correspond to those in FIGS. 2A and 2B, are given the same reference numerals, and descriptions thereof are omitted where appropriate.

A box-type battery 31 is formed of a lithium primary battery or a lithium secondary battery having a width corresponding to two AA size batteries. As indicated by the dotted-line arrow of FIG. 3A, the AA size batteries 21-1 and 21-2 are housed in the battery box 11. In this case, since the box-type battery 31 is housed in the battery box 11, the movable sill 13 is moved downwards in FIG. 3B. That is, when the box-type battery 31 is housed in the battery box 11, the battery detection switch 15 shifts to an on state.

Figure 4:
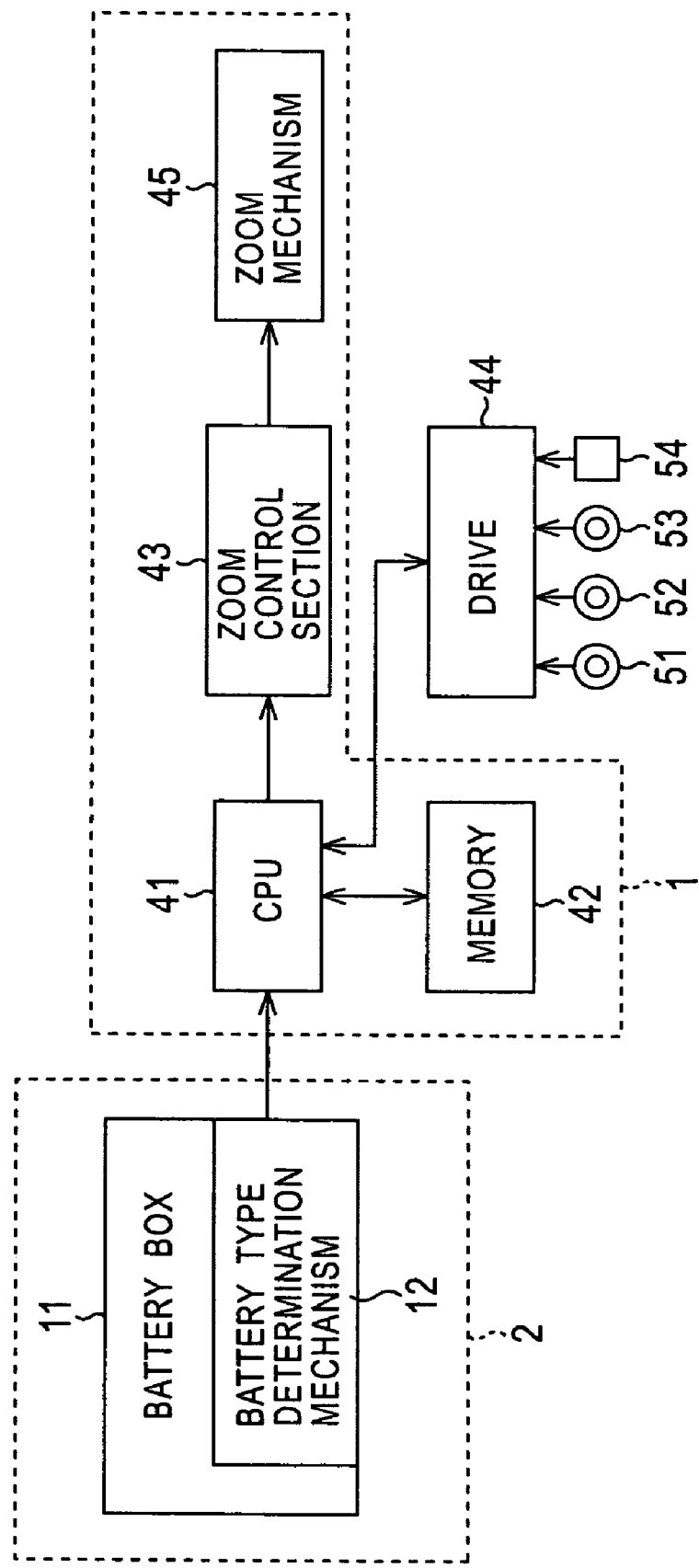
FIG. 4 shows an example of the interior configuration of an imaging device and a battery.

FIG. 4 shows an example of the interior configuration of the imaging device 1 and the battery 2 shown in FIG. 1.

A CPU 41 determines the type of loaded battery on the basis of an on or off detected signal supplied from the battery detection switch 15 of the battery type determination mechanism 12 of the battery 2. Based on the determination result, the CPU 41 reads the corresponding zoom speed set value (FIG. 5) by referring to a memory 42, and supplies the value to a zoom control section 43.

The memory 42 has prestored therein a table of zoom speed set values of a zoom mechanism 45 according to the type of battery. Furthermore, in the memory 42, data which is basically fixed among programs and parameters for computations, used by the CPU 41, may be stored, or parameters which vary appropriately during the program execution may be stored.

A description will now be given, with reference to FIG. 5, of an example of the table of the zoom speed set values recorded in the memory 42. As shown in FIG. 5, the zoom speed set values are stored so as to correspond to the detected signal supplied from the battery detection switch 15.

In the example of FIG. 5, a zoom speed set value (seconds) of "A1 (slow)" is recorded to correspond to the detected signal "OFF", and a zoom speed set value (seconds) of "A2 (fast)" is recorded to correspond to the detected signal "ON".

In the memory 42, values such that the times "A1" and "A2" are converted by a predetermined calculation method may be stored.

Now, the following description returns back to FIG. 4. Here, the zoom control section 43 performs control so that the zoom speed of the zoom mechanism 45 is changed on the basis of the zoom speed set value supplied from the CPU 41.

Also, a drive 44 is connected to the CPU 41 as necessary, and a magnetic disk 51, an optical disk 52, an magneto-optical disk 53, a semiconductor memory 54, etc., is loaded into the drive 44 as necessary. The drive 44 reads data or a program recorded on the magnetic disk 51, the optical disk 52, the magneto-optical disk 53, or the semiconductor memory 54, and supplies the data or the program to the CPU 41 or the memory 42.

A description will now be given below assuming that a table of zoom speed set values corresponding to the type of battery is prestored. Alternatively, the drive 44 may be connected to the CPU 41, so that the magnetic disk 51, the optical disk 52, the magneto-optical disk 53, or the semiconductor memory 54 may be loaded into the drive 44, the table of the zoom speed set values recorded thereon may be read, and the table may be stored in the memory 42.

In the imaging device 1, in order to drive the zoom mechanism 45 at a higher speed, a larger power is required at a shorter time. That is, when the battery performance is poor, if attempts are made to drive the zoom mechanism 45 at a higher speed, the service line of the battery is worsened.

The box-type battery 31 shown in FIGS. 3A and 3B has a battery capacity larger than that of the AA size batteries 21-1 and 21-2 shown in FIGS. 2A and 2B, and has a battery impedance smaller than that thereof. Therefore, even if the zoom mechanism 45 is driven at a zoom speed at a higher speed than that when an AA size battery is used, an influence exerted on the service life of the battery is small.

Accordingly, in the imaging device 1 shown in FIG. 4, when the detected signal supplied from the battery detection switch 15 is an ON signal (when the box-type battery 31 is used), the zoom mechanism 45 is driven at a higher speed, and when the detected signal is an OFF signal (when the AA size batteries 21-1 and 21-2 are used), the zoom mechanism 45 is driven at a normal speed (or at a speed lower than the zoom speed when the box-type battery 31 is used).

A description will now be given, with reference to the flowchart in FIG. 6, of a zoom speed control process performed by the imaging device 1 of FIG. 4. When this process is to be started, it is assumed that the battery 2 is loaded into the imaging device 1 and that a detected signal is supplied from the battery detection switch 15 of the battery type determination mechanism 12 of the battery 2.

In step S1, the CPU 41 of the imaging device 1 determines whether or not the detected signal supplied from the battery detection switch 15 is an ON signal or an OFF signal. In step S2, based on the determination result by the process in step S1, the CPU 41 reads the corresponding zoom speed set value (FIG. 5) by referring to the memory 42 and supplies the value to the zoom control section 43.

For example, when the detected signal is an OFF signal (when the AA size batteries 21-1 and 21-2 are used), a zoom speed set value (seconds) of "A1 (slow)" is read, and when the detected signal is an ON signal (when the box-type battery 31 is used), a zoom speed set value (seconds) of "A2 (fast)" is read.

In step S3, based on the zoom speed set value supplied from the CPU 41, the zoom control section 43 controls the zoom speed of the zoom mechanism 45.

For example, when the zoom speed set value (seconds) of "A1 (slow)" is supplied from the CPU 41, the zoom mechanism 45 is driven at a zoom speed of "A1 (seconds)". Furthermore, for example, when the zoom speed set value (seconds) of "A2 (fast)" is supplied from the CPU 41, the zoom mechanism 45 is driven at a zoom speed of "A2 (seconds)". The relationship of power consumption is A1<A2.

In this manner, the imaging device 1 determines the type of battery housed in the battery box 11 of the battery 2, so that, when the box-type battery 31 is used, the zoom mechanism 45 can be driven at a higher speed than that when the AA size batteries 21-1 and 21-2 are used.

The imaging device 1 not only can perform control so that the zoom speed of the zoom mechanism 45 is changed according to the type of battery housed in the battery box 11 of the battery 2, but also can perform control so that other operating conditions such as the brightness of the display screen and the strobe charging time are changed. An example of the configuration, as well as the operation thereof, when control is performed to change the other operating conditions will now be described below in sequence.

Figure 7:
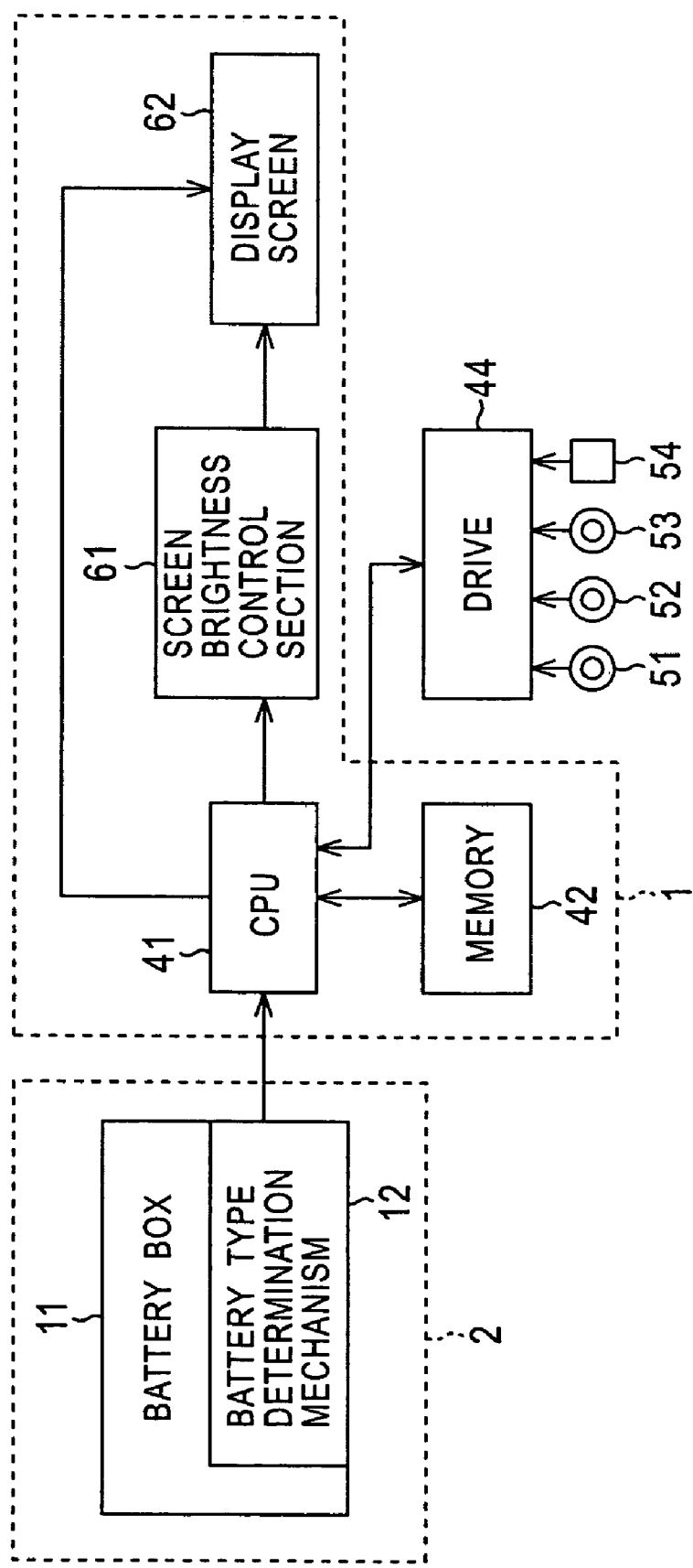
FIG. 7 shows another example of the interior configuration of an imaging device and a battery.

FIG. 7 shows another example of the interior configuration of the imaging device 1 and the battery 2 shown in FIG. 1. Components in FIG. 7, which correspond to those in FIG. 4, are given the same reference numerals, and descriptions thereof are omitted where appropriate.

The memory 42 has prestored therein a table of brightness set values of a display screen 62, which correspond to the type of battery. Of course, the drive 44 may be connected to the CPU 41, so that the magnetic disk 51, the optical disk 52, the magneto-optical disk 53, or the semiconductor memory 54 may be loaded into the drive 44, and the table of the brightness set values recorded thereon may be read and stored in the memory 42.

Referring to FIG. 8, an example of the table of the brightness set values recorded in the memory 42 will be described. As shown in FIG. 8, the brightness set values are stored so as to correspond to the detected signal supplied from the battery detection switch 15.

In the example of FIG. 8, a brightness set value (cd/m$^2$ of "B1 (dark)" is recorded to correspond to the detected signal "OFF", and a brightness set value (cd/m$^2$) of "B2 (bright)" is recorded to correspond to the detected signal "ON".

In the memory 42, values such that the brightness "B1" and "B2" are converted by a predetermined calculation method may be stored.

Now, the following description returns back to FIG. 8. Here, the CPU 41 determines the type of loaded battery on the basis of the ON or OFF detected signal supplied from the battery detection switch 15 of the battery type determination mechanism 12 of the battery 2. Based on the determination result, the CPU 41 reads the corresponding brightness set value (FIG. 8) by referring to the memory 42, and supplies the value to a screen brightness control section 61.

Based on the brightness set value supplied from the CPU 41, the screen brightness control section 61 performs control so that the brightness of the display screen 62 is changed.

The display screen 62, formed of a thin display device such as a liquid-crystal display device, receives data from the CPU 41 and displays images or characters corresponding to the received data.

In the imaging device 1, in order to cause the display screen 62 to make a brighter display, a larger power is required. That is, in a case where the battery performance is poor, if the display screen 62 is caused to make a brighter display, the service life of the battery is worsened.

The box-type battery 31 shown in FIGS. 3A and 3B, as described above, have a battery capacity larger than that of the AA size batteries 21-1 and 21-2 shown in FIGS. 2A and 2B, and have a smaller battery impedance. Therefore, even if the display screen 62 is displayed more brightly than that when an AA size battery is used, an influence exerted on the service life of the battery is small.

Accordingly, in the imaging device 1 shown in FIG. 7, when the detected signal supplied from the battery detection switch 15 is an ON signal (when the box-type battery 31 is used), the display screen 62 is displayed more brightly, and when the detected signal is an OFF signal (when the AA size batteries 21-1 and 21-2 are used), the display screen 62 is displayed at a normal brightness (or darker than the brightness when the box-type battery 31 is used).

Referring to the flowchart in FIG. 9, a screen brightness control process performed by the imaging device 1 of FIG. 7 will be described. When this process is to be started, it is assumed that the battery 2 is loaded into the imaging device and that a detected signal is supplied from the battery detection switch 15 of the battery type determination mechanism 12 of the battery 2.

In step S11, the CPU 41 of the imaging device 1 determines whether or not the detected signal supplied from the battery detection switch 15 is an ON signal or an OFF signal. In step S12, based on the determination result by the process of step S11, the CPU 41 reads the corresponding brightness set value (FIG. 8) by referring to the memory 42 and supplies the value to the screen brightness control section 61.

For example, when the detected signal is an OFF signal (when the AA size batteries 21-1 and 21-2 are used), a brightness set value (cd/m$^2$) of "B1 (dark)" is read, and when the detected signal is an ON signal (when the box-type battery 31 is used), a brightness set value (cd/m$^2$) of "B2 (bright)" is read.

In step S13, based on the brightness set value supplied from the CPU 41, the screen brightness control section 61 controls the brightness of the display screen 62.

For example, when the brightness set value (cd/m$^2$) of "B1 (dark)" is supplied from the CPU 41, the display screen 62 is displayed at a brightness of "B1 (cd/m$^2$)". Furthermore, for example, when the brightness set value (cd/m$^2$) of "B2 (bright)" is supplied from the CPU 41, the display screen 62 is displayed at a brightness of "B2 (cd/m$^2$)". The relationship of power consumption is B1<B2.

In this manner, the imaging device 1 determines the type of battery housed in the battery box 11 of the battery 2. When the box-type battery 31 is used, it is possible to cause the display screen 62 to be displayed more brightly than that when the AA size batteries 21-1 and 21-2 are used.

Figure 10:
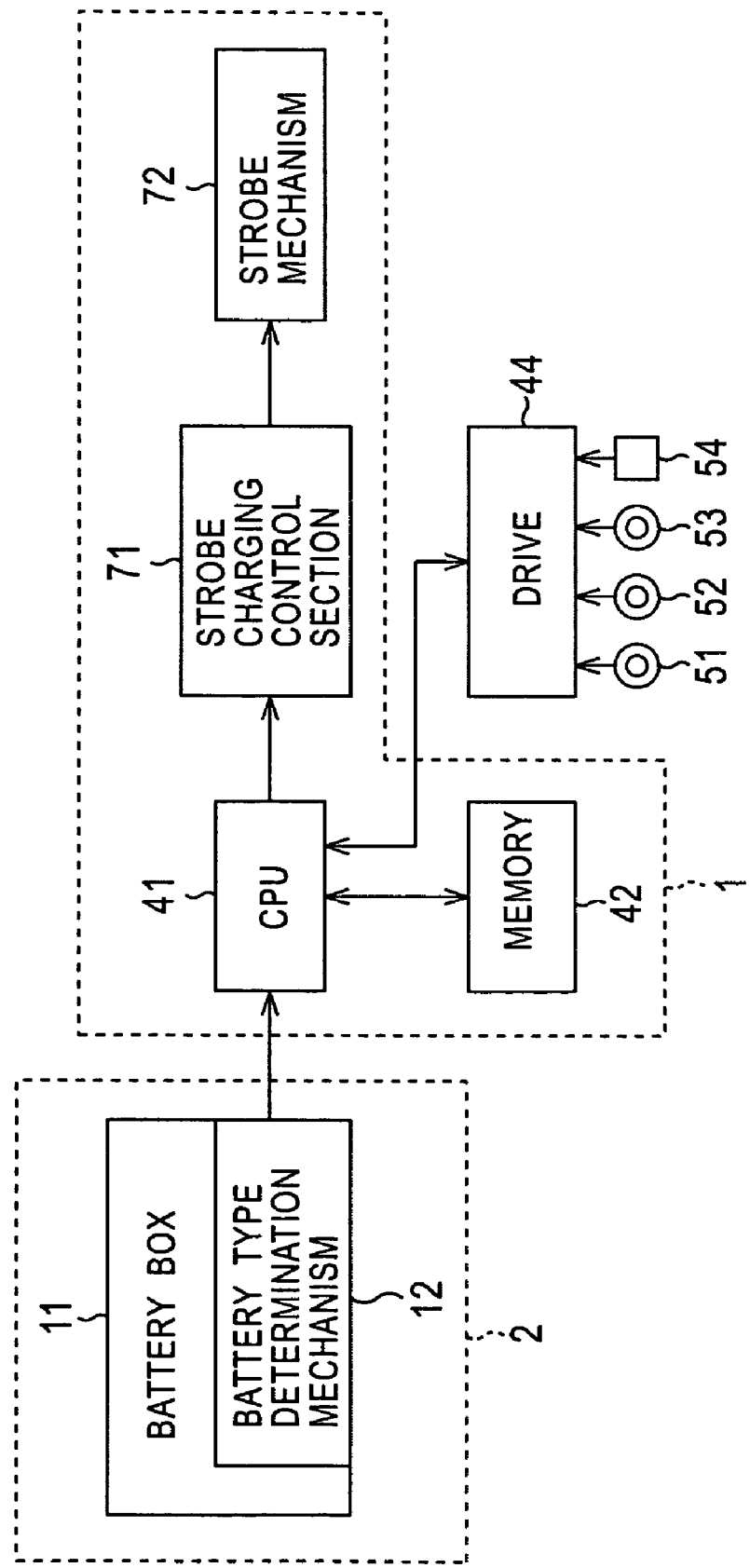
FIG. 10 shows another example of the interior configuration of an imaging device and a battery.

FIG. 10 shows another example of the interior configuration of the imaging device 1 and the battery 2 shown in FIG. 1. Components in FIG. 10, which correspond to those in FIG. 4, are given the same reference numerals, and descriptions thereof are omitted where appropriate.

The memory 42 has prestored therein a table of strobe charging time set values of the strobe mechanism 72, which correspond to the type of battery. Of course, the drive 44 may be connected to the CPU 41, so that the magnetic disk 51, the optical disk 52, the magneto-optical disk 53, or the semiconductor memory 54 may be loaded into the drive 44, and the table of the strobe charging time set values recorded thereon may be read and stored in the memory 42.

Referring to FIG. 11, an example of the table of the strobe charging time set values recorded in the memory 42 will be described. As shown in FIG. 11, the strobe charging time set values are stored so as to correspond to the detected signal supplied from the battery detection switch 15.

In the example of FIG. 11, a strobe charging time set value (seconds) of "C1 (slow)" is recorded to correspond to the detected signal "OFF", and a strobe charging time set value (seconds) of "C2 (fast)" is recorded to correspond to the detected signal "ON".

In the memory 42, values such that the times "C1" and "C2" are converted by a predetermined calculation method may be stored.

Now, the following description returns back to FIG. 10. Here, the CPU 41 determines the type of battery housed in the battery box 11 on the basis of the ON or OFF detected signal supplied from the battery detection switch 15 of the battery type determination mechanism 12 of the battery 2. Based on the determination result, the CPU 41 reads the corresponding strobe charging time set value (FIG. 11) by referring to the memory 42, and supplies the value to a strobe charging control section 71.

Based on the strobe charging time set value supplied from the CPU 41, the strobe charging control section 71 performs control so that the charging time of a strobe capacitor (not shown) of a strobe mechanism 72 is changed.

In the imaging device 1, in order to cause the strobe capacitor of the strobe mechanism 72 to be charged faster, a larger power is required at a shorter time. That is, in a case where the battery performance is poor, if the strobe charging time is to be made shorter, the service life of the battery is worsened.

The box-type battery 31 shown in FIGS. 3A and 3B, as described above, have a battery capacity larger than that of the AA size batteries 21-1 and 21-2 shown in FIGS. 2A and 2B, and have a smaller battery impedance. Therefore, even if strobe charging is performed at a shorter time than that when an AA size battery is used, an influence exerted on the service life of the battery is small.

Accordingly, in the imaging device 1 shown in FIG. 10, when the detected signal supplied from the battery detection switch 15 is an ON signal (when the box-type battery 31 is used), the strobe capacitor of the strobe mechanism 72 is charged at a shorter charging time, and when the detected signal is an OFF signal (when the AA size batteries 21-1 and 21-2 are used), the strobe capacitor of the strobe mechanism 72 is charged at a normal charging time (or longer than the charging time when the box-type battery 31 is used).

A description will now be given, with reference to the flowchart in FIG. 12, of a strobe charging time control process performed by the imaging device 1 of FIG. 10. When this process is to be started, it is assumed that the battery 2 is loaded into the imaging device 1 and that a detected signal is supplied from the battery detection switch 15 of the battery type determination mechanism 12 of the battery 2.

In step S21, the CPU 41 of the imaging device 1 determines whether or not the detected signal supplied from the battery detection switch 15 is an ON signal or an OFF signal. In step S22, based on the determination result by the process in step S21, the CPU 41 reads the corresponding strobe charging time set value (FIG. 11) by referring to the memory 42, and supplies the value to the strobe charging control section 71.

For example, when the detected signal is an OFF signal (when the AA size batteries 21-1 and 21-2 are used), a strobe charging time set value (seconds) of "C1 (slow)" is read, and when the detected signal is an ON signal (when the box-type battery 31 is used), a strobe charging time set value (seconds) of "C2 (fast)" is read.

In step S23, based on the strobe charging time set value supplied from the CPU 41, the strobe charging control section 71 controls the strobe charging time of the strobe mechanism 72.

For example, when the strobe charging time set value (seconds) of "C1 (slow)" is supplied from the CPU 41, the strobe capacitor of the strobe mechanism 72 is charged at a charging time "C1 (seconds)". For example, when the strobe charging time set value (seconds) of "C2 (fast)" is supplied from the CPU 41, the strobe capacitor of the strobe mechanism 72 is charged at a charging time "C2 (seconds)". The relationship of power consumption is C1<C2.

In this manner, the imaging device 1 determines the type of battery housed in the battery box 11 of the battery 2, so that, when the box-type battery 31 is used, the strobe capacitor of the strobe mechanism 72 can be charged at a shorter time than that when the AA size batteries 21-1 and 21-2 are used.

Figure 13:
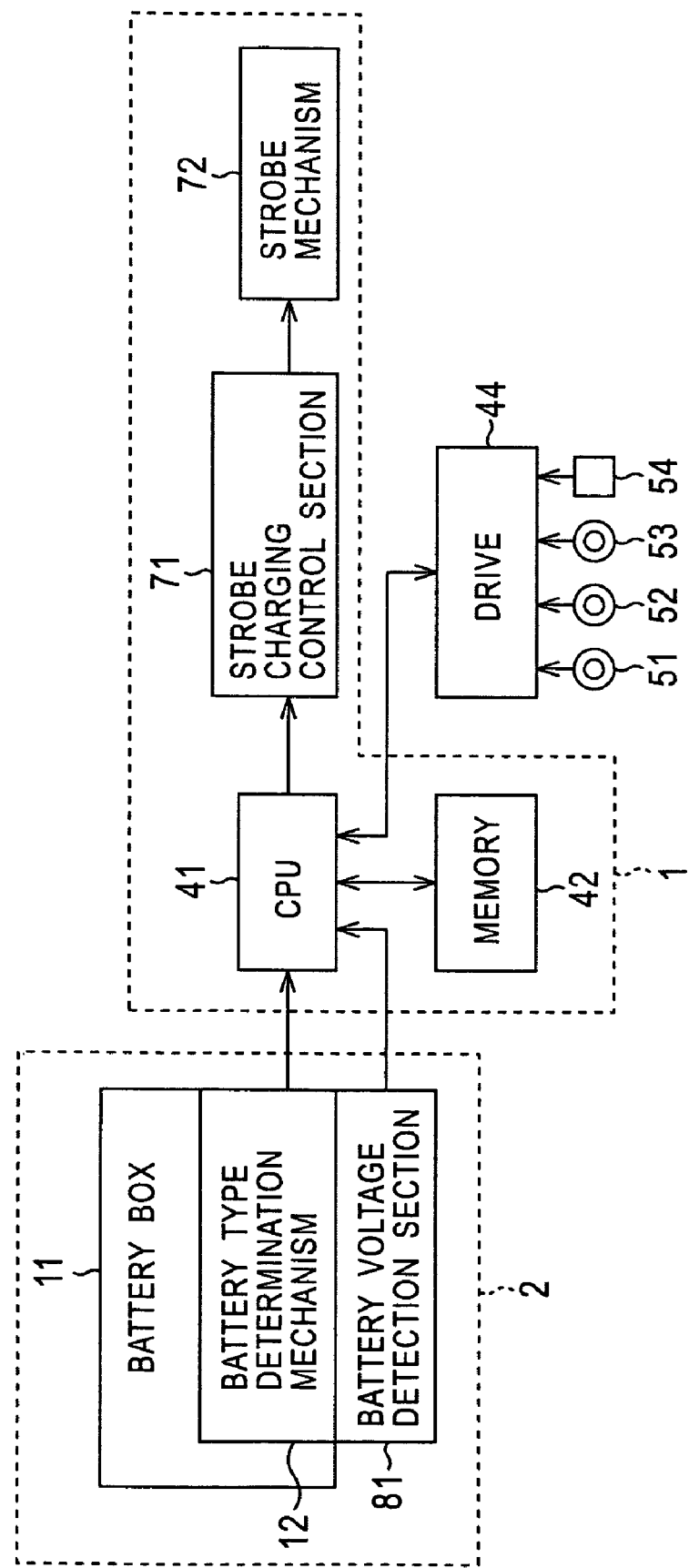
FIG. 13 shows another example of the interior configuration of an imaging device and a battery.

FIG. 13 shows another example of the interior configuration of the imaging device 1 and the battery 2 shown in FIG. 1. Components in FIG. 13, which correspond to those in FIG. 10, are given the same reference numerals, and descriptions thereof are omitted where appropriate. The case of the example of FIG. 13 is configured the same as that of FIG. 10 except that a battery voltage detection section 81 is newly provided.

The battery voltage detection section 81 detects the voltage of the battery housed in the battery box 11, and supplies the battery voltage information (detected voltage) to the imaging device 1.

The memory 42 has prestored therein a table of strobe charging time set values of the strobe mechanism 72, which correspond to the type of battery and the battery voltage information.

Figures 14, 15:
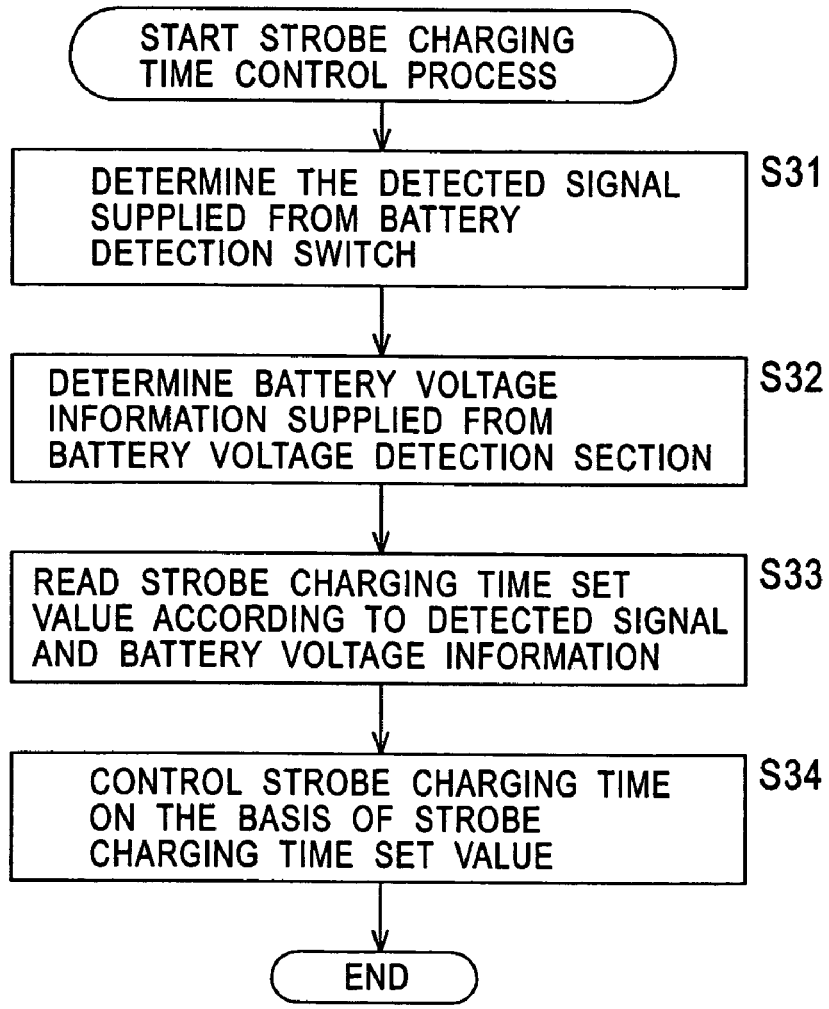
FIG. 14 shows an example of a table of strobe charging time set values recorded in a memory 42 of FIG. 13.
FIG. 15 is a flowchart illustrating a strobe charging time control process performed by the imaging device of FIG. 13.

Referring to FIG. 14, an example of the table of the strobe charging time set values recorded in the memory 42 will be described. As shown in FIG. 14, the strobe charging time set values are stored so as to correspond to the detected signal supplied from the battery detection switch 15 and the battery voltage information (detected voltage) supplied from the battery voltage detection section 81. Vbatt indicates a detected voltage, and Vth indicates a predetermined threshold voltage.

In the example of FIG. 14, a strobe charging time set value (seconds) of "D1" is recorded so as to correspond to a detected signal "OFF" and a detected voltage "Vbatt≧Vth". A strobe charging time set value (seconds) of "D2" is recorded so as to correspond to a detected signal "OFF" and a detected voltage "Vbatt<Vth". A strobe charging time set value (seconds) of "D3" is recorded so as to correspond to a detected signal "ON" and a detected voltage "Vbatt≧Vth". A strobe charging time set value (seconds) of "D4" is recorded so as to correspond to a detected signal "ON" and a detected voltage "Vbatt<Vth".

Now, the following description returns back to FIG. 13. Here, based on the ON or OFF detected signal supplied from the battery detection switch 15 of the battery type determination mechanism 12 of the battery 2, the CPU 41 determines the type of battery housed in the battery box 11, and determines whether or not the detected voltage Vbatt is greater than the predetermined threshold value Vth on the basis of the battery voltage information supplied from the battery voltage detection section 81. Based on these determination results, the CPU 41 reads the corresponding strobe charging time set value (FIG. 14) by referring to the memory 42 and supplies the value to the strobe charging control section 71.

Based on the strobe charging time set value supplied from the CPU 41, the strobe charging control section 71 performs control so that the charging time of the strobe capacitor of the strobe mechanism 72 is changed.

As general battery characteristics, when the battery voltage is decreased, the battery characteristics are deteriorated, for example, as a result of the internal impedance being increased. That is, in the imaging device 1, in a case where the battery voltage is decreased, if attempts are made to decrease the strobe charging time, the service life of the battery is worsened.

Therefore, in the imaging device 1 shown in FIG. 13, in a case where the detected signal supplied from the battery detection switch 15 is an ON signal (when the box-type battery 31 is used) and the detected voltage supplied from the battery voltage detection section 81 is equal to or greater than a predetermined threshold value, the strobe capacitor of the strobe mechanism 72 is charged at the shortest charging time. In a case where the detected signal is an ON signal and the detected voltage is smaller than the predetermined threshold value, the strobe mechanism 72 is charged at a time shorter than at a normal time. In a case where the detected signal is an OFF signal (when the AA size batteries 21-1 and 21-2 are used) and the detected voltage is equal to or greater than the predetermined threshold value, the strobe mechanism 72 is charged at a normal charging time. In a case where the detected signal is an OFF signal and the detected voltage is smaller than the predetermined threshold value, the strobe mechanism 72 is charged at a time longer than the normal time.

Referring to the flowchart in FIG. 15, a strobe charging time control process performed by the imaging device 1 of FIG. 13 will now be described below. When this process is to be started, it is assumed that the battery 2 is loaded into the imaging device, that a detected signal is supplied from the battery detection switch 15 of the battery type determination mechanism 12 of the battery 2, and that a detected voltage is supplied from the battery voltage detection section 81.

In step S31, the CPU 41 of the imaging device 1 determines whether or not the detected signal supplied from the battery detection switch 15 is an ON signal or an OFF signal. In step S32, based on the battery voltage information supplied from the battery voltage detection section 81, the CPU 41 determines whether or not the detected voltage Vbatt is greater than the threshold value Vth.

In step S33, based on the determination results of the processes of steps S31 and S32, that is, based on the detected signal and the battery voltage information, the CPU 41 reads the corresponding strobe charging time set value (FIG. 14) by referring to the memory 42, and supplies the value to the strobe charging control section 71.

For example, when the detected signal is an OFF signal (when the AA size batteries 21-1 and 21-2 are used) and the detected voltage is equal to or greater than the predetermined threshold value, a strobe charging time set value (seconds) of "D1" is read. When the detected signal is an OFF signal and the detected voltage is smaller than the threshold value, a strobe charging time set value (seconds) of "D2" is read. When the detected signal is an ON signal (when the box-type battery 31 is used) and the detected voltage is equal to or greater than the predetermined threshold value, a strobe charging time set value (seconds) of "D3" is read. When the detected signal is an ON signal and the detected voltage is smaller than the predetermined threshold value, a strobe charging time set value (seconds) of "D4" is read.

In step S34, based on the strobe charging time set value supplied from the CPU 41, the strobe charging control section 71 controls the strobe charging time of the strobe mechanism 72.

For example, when a strobe charging time set value (seconds) of "D1" is supplied from the CPU 41, the strobe capacitor of the strobe mechanism 72 is charged at a charging time "D1 (seconds)". Furthermore, for example, when the strobe charging time set values (seconds) of "D2", "D3", and "D4" are supplied from the CPU 41, the strobe capacitor of the strobe mechanism 72 is charged at charging times "D2 (seconds)", "D3 (seconds)", and "D4 (seconds)", respectively. The relationship of power consumption is D2<D1<D4<D3.

In this manner, in the imaging device 1, it is possible to cause the strobe capacitor of the strobe mechanism 72 to be charged at the most appropriate charging time on the basis of the type of battery housed in the battery box 11 of the battery 2 and the battery voltage.

Not only can the strobe capacitor of the strobe mechanism 72 be charged at the most appropriate charging time on the basis of the type of battery housed in the battery box 11 of the battery 2 and the battery voltage, but also, for example, the zoom mechanism 45 (FIG. 4) can be zoomed at the most appropriate zoom speed or the display screen 62 (FIG. 10) can be displayed at the most appropriate brightness.

Figure 16:
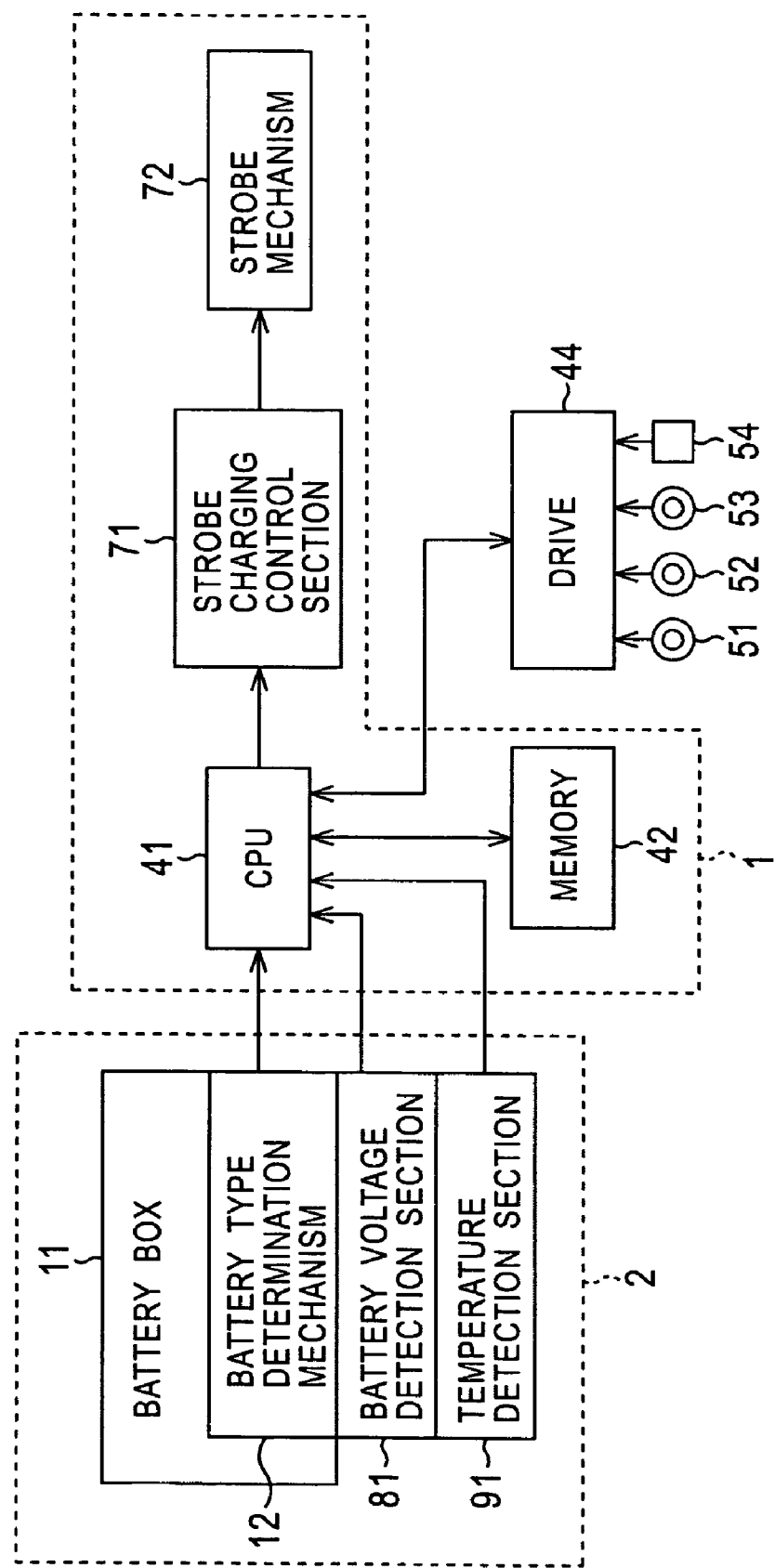
FIG. 16 shows another example of the interior configuration of an imaging device and a battery.

FIG. 16 shows another example of the interior configuration of the imaging device 1 and the battery 2 shown in FIG. 1. Components in FIG. 16, which correspond to those in FIG. 13, are given the same reference numerals, and descriptions thereof are omitted where appropriate. The case of the example of FIG. 16 is configured the same as that of FIG. 13 except that a temperature detection section 91 is newly provided.

The temperature detection section 91 detects the ambient temperature of the battery housed in the battery box 11, and supplies the temperature information (detected temperature) to the imaging device 1.

The memory 42 has prestored therein a table of strobe charging time set values corresponding to the type of battery, battery voltage information, and temperature information.

Referring to FIG. 17, an example of the table of the strobe charging time set values recorded in the memory 42 will now be described. As shown in FIG. 17, the strobe charging time set values are stored so as to correspond to the detected signal supplied from the battery detection switch 15, the battery voltage information (detected voltage) supplied from the battery voltage detection section 81, and the temperature information (detected temperature) supplied from the temperature detection section 91. Vbatt indicates a detected voltage. Vth indicates a predetermined threshold voltage. T indicates a detected temperature. Tth indicates a predetermined threshold temperature.

In the example of FIG. 17, a strobe charging time set value (seconds) of "E1" is recorded so as to correspond to the detected signal "OFF", the detected voltage "Vbatt≧Vth", and the detected temperature "T≧Tth". A strobe charging time set value (seconds) of "E2" is recorded so as to correspond to the detected signal "OFF", the detected voltage "Vbatt≧Vth", and the detected temperature "T<Tth". A strobe charging time set value (seconds) of "E3" is recorded so as to correspond to the detected signal "OFF", the detected voltage "Vbatt<Vth", and the detected temperature "T≧Tth". A strobe charging time set value (seconds) "E4" is recorded so as to correspond to the detected signal "OFF", the detected voltage "Vbatt<Vth", and the detected temperature "T<Tth".

Furthermore, a strobe charging time set value (seconds) of "E5" is recorded so as to correspond to the detected signal "ON", the detected voltage "Vbatt≧Vth", and the detected temperature "T≧Tth". A strobe charging time set value (seconds) of "E6" is recorded so as to correspond to the detected signal "ON", the detected voltage "Vbatt≧Vth", and the detected temperature "T<Tth". A strobe charging time set value (seconds) of "E7" is recorded so as to correspond to the detected signal "ON", the detected voltage "Vbatt<Vth", and the detected temperature "T≧Tth". A strobe charging time set value (seconds) of "E8" is recorded so as to correspond to the detected signal "ON", the detected voltage "Vbatt<Vth", and the detected temperature "T<Tth".

Now, the following description returns back to FIG. 16. Here, the CPU 41 determines the type of battery housed in the battery box 11 on the basis of an ON or OFF detected signal supplied from the battery detection switch 15 of the battery type determination mechanism 12 of the battery 2. The CPU 41 determines whether or not the detected voltage Vbatt is greater than a threshold value Vth on the basis of the battery voltage information supplied from the battery voltage detection section 81, and further determines whether or not the detected temperature T is greater than a threshold value Tth on the basis of the temperature information supplied from the temperature detection section 91. Based on these determination results, the CPU 41 reads the corresponding strobe charging time set value (FIG. 17) by referring to the memory 42, and supplies the value to the strobe charging control section 71.

Based on the strobe charging time set value supplied from the CPU 41, the strobe charging control section 71 performs control so that the charging time of the strobe capacitor of the strobe mechanism 72 is changed.

As general battery characteristics, when the ambient temperature is decreased, the battery characteristics are deteriorated, for example, as a result of the internal impedance being increased. That is, in the imaging device 1, in a case where the ambient temperature is decreased, if attempts are made to decrease the strobe charging time, the service life of the battery is worsened.

Therefore, in the imaging device 1 shown in FIG. 16, in a case where the detected signal supplied from the battery detection switch 15 is an ON signal (when the box-type battery 31 is used), the detected voltage supplied from the battery voltage detection section 81 is equal to or greater than a predetermined threshold value, and the detected temperature supplied from the temperature detection section 91 is equal to or greater than a predetermined threshold value, the strobe mechanism 72 is charged at the shortest charging time. In a case where the detected signal is an OFF signal (when the AA size batteries 21-1 and 21-2 are used), the detected voltage is smaller than a predetermined threshold value, and the detected temperature is smaller than a predetermined threshold value, the strobe mechanism 72 is charged at the longest time. In a similar manner, the strobe mechanism 72 is charged at the most appropriate charging time according to the detected signal, the detected voltage, and the detected temperature.

Figure 18:
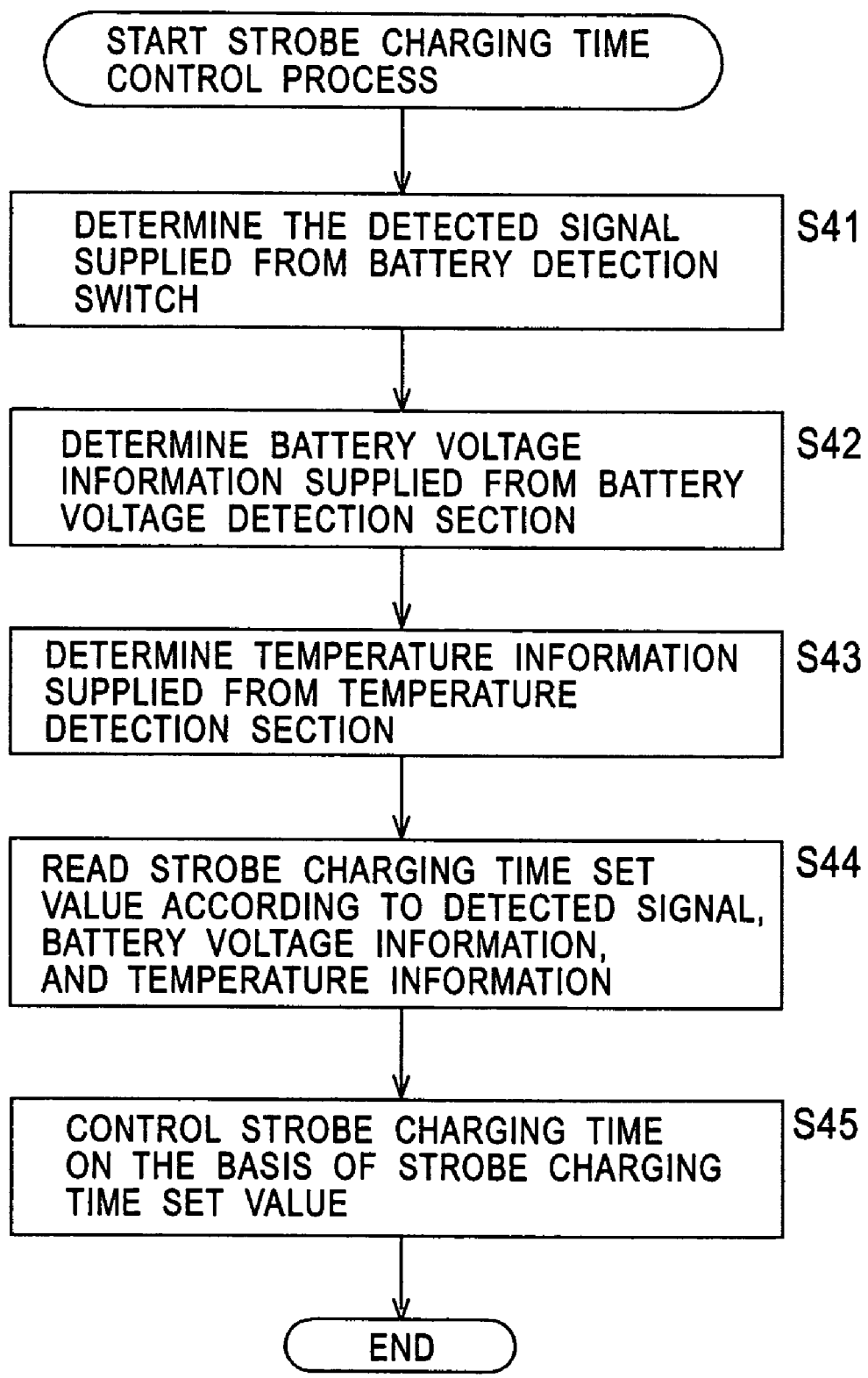
FIG. 18 is a flowchart illustrating a strobe charging time control process performed by the imaging device 1 of FIG. 16.

Referring to the flowchart in FIG. 18, a strobe charging time control process performed by the imaging device 1 of FIG. 16 will now be described. When this process is to be started, it is assumed that the battery 2 is loaded into the imaging device 1, a detected signal is supplied from the battery detection switch 15 of the battery type determination mechanism 12 of the battery 2, a detected voltage is supplied from the battery voltage detection section 81, and a detected temperature is supplied from the temperature detection section 91.

In step S41, the CPU 41 of the imaging device 1 determines whether or not the detected signal supplied from the battery detection switch 15 is an ON signal or an OFF signal. In step S42, based on the battery voltage information supplied from the battery voltage detection section 81, the CPU 41 determines whether or not the detected voltage Vbatt is greater than a threshold value Vth. In step S43, based on the temperature information supplied from the temperature detection section 91, the CPU 41 determines whether or not the detected temperature T is greater than the threshold value Tth.

In step S44, based on the determination results by the processes of steps S41 to S43, that is, based on the detected signal, the battery voltage information, and the temperature information, the CPU 41 reads the corresponding strobe charging time set value (FIG. 17) by referring to the memory 42, and supplies the value to the strobe charging control section 71.

For example, when the detected signal is an OFF signal (when the AA size batteries 21-1 and 21-2 are used) and the detected voltage and the detected temperature are equal to or greater than the predetermined threshold value, a strobe charging time set value (seconds) of "E1" is read. When the detected signal is OFF signal and the detected voltage and the detected temperature are smaller than the predetermined threshold value, a strobe charging time set value (seconds) of "E2" is read. When the detected signal is an OFF signal, the detected voltage is smaller than the predetermined threshold value, and the detected temperature is equal to or greater than the predetermined threshold value, a strobe charging time set value (seconds) of "E3" is read. When the detected signal is an OFF signal, and the detected voltage and the detected temperature are smaller than the predetermined threshold value, a strobe charging time set value (seconds) of "E4" is read.

Furthermore, for example, when the detected signal is an ON signal (when the box-type battery 31 is used) and the detected voltage and the detected temperature are equal to or greater than the predetermined threshold value, a strobe charging time set value (seconds) of "E5" is read. When the detected signal is an ON signal, and the detected voltage and the detected temperature are smaller than the predetermined threshold value, a strobe charging time set value (seconds) of "E6" is read. When the detected signal is an ON signal, the detected voltage is smaller than the predetermined threshold value, and the detected temperature is equal to or greater than the predetermined threshold value, a strobe charging time set value (seconds) of "E7" is read. When the detected signal is an OFF signal, and the detected voltage and the detected temperature are smaller than the predetermined threshold value, a strobe charging time set value (seconds) of "E8" is read.

In step S45, based on the strobe charging time set value supplied from the CPU 41, the strobe charging control section 71 controls the strobe charging time of the strobe mechanism 72.

For example, when the strobe charging time set value (seconds) "E1" is supplied from the CPU 41, the strobe capacitor of the strobe mechanism 72 is charged at the charging time of "E1 (seconds)". Furthermore, for example, when the strobe charging time set values (seconds) of "E2", "E3", "E4", "E5", "E6", "E7", or "E8" are supplied from the CPU 41, the strobe capacitor of the strobe mechanism 72 is charged at the charging times "E2 (seconds)", "E3", "E4", "E5", "E6", "E7", and "E8" are charged, respectively. The relationship of power consumption is E4<E3<E2<E1<E8<E7<E6<E5.

In this manner, in the imaging device 1, it is possible to cause the strobe capacitor of the strobe mechanism 72 to be charged at the most appropriate charging time on the basis of the type of battery housed in the battery box 11 of the battery 2, the battery voltage, and the ambient temperature of the battery.

Not only can the strobe capacitor of the strobe mechanism 72 be charged at the most appropriate charging time on the basis of the type of battery housed in the battery box 11 of the battery 2, the battery voltage, and the ambient temperature of the battery, but also, for example, the zoom mechanism 45 (FIG. 4) can be zoomed at the most appropriate zoom speed or the display screen 62 (FIG. 10) can be displayed at the most appropriate brightness.

In the foregoing, an example of the configuration in a case where the zoom speed of the zoom mechanism 45 is controlled according to the type of battery is shown in FIG. 4. An example of the configuration in a case where the brightness of the display screen 62 is controlled according to the type of battery is shown in FIG. 7. An example of the configuration in a case where the strobe charging time of the strobe mechanism 72 is controlled according to the type of battery is shown in. FIG. 10. Furthermore, an example of the configuration in a case where the strobe charging time of the strobe mechanism 72 is controlled according to the type of battery and the battery voltage is shown in FIG. 13. An example of the configuration in a case where the strobe charging time of the strobe mechanism 72 is controlled according to the type of battery, the battery voltage, and the ambient temperature of the battery is shown in FIG. 16. These are individually shown to facilitate the understanding of the descriptions, and of course, the zoom speed, the brightness of the screen, and the strobe charging time can be controlled at any desired combination.

Figure 19:
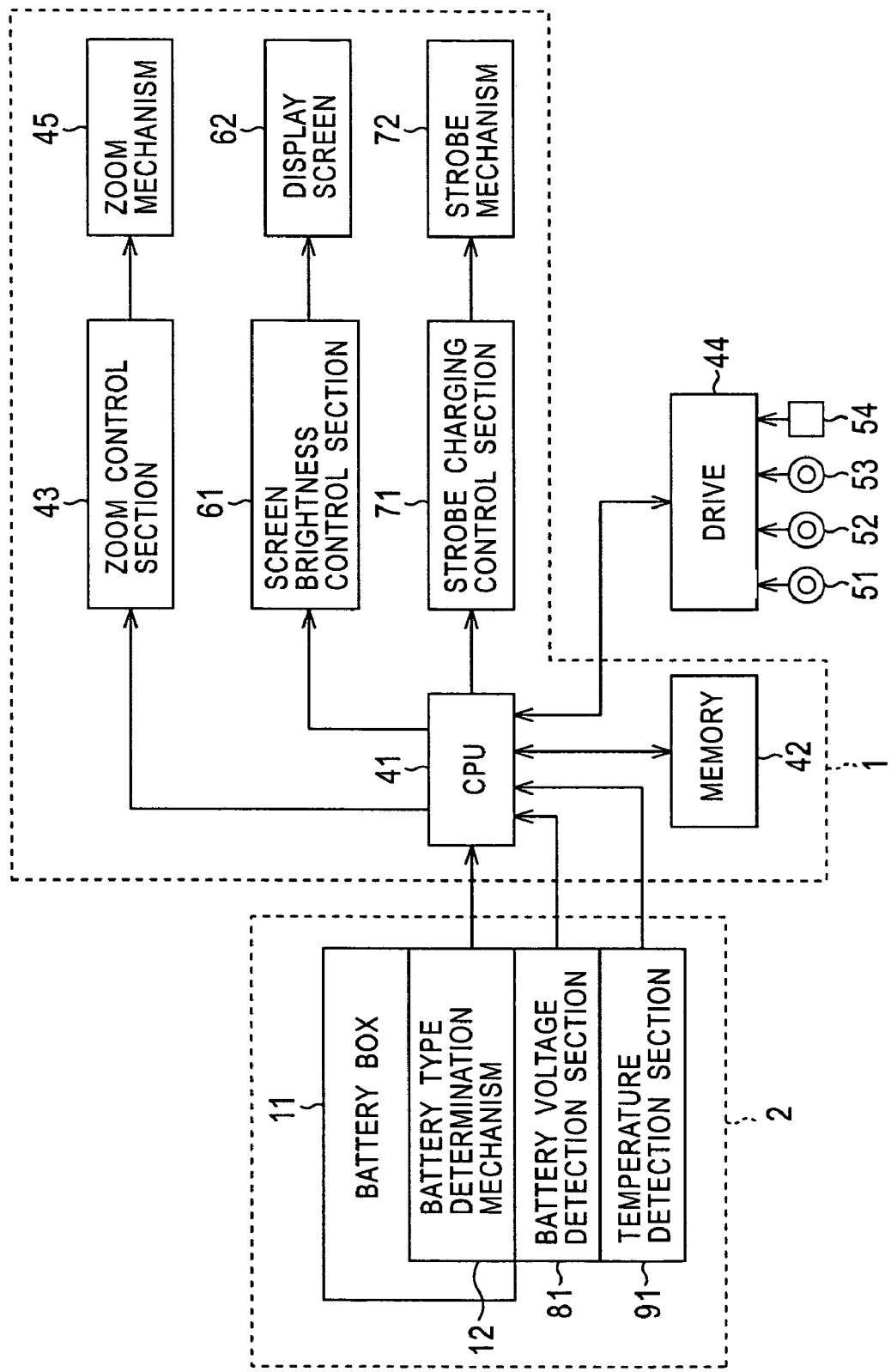
FIG. 19 shows another example of the interior configuration of an imaging device and a battery.

An example of the configuration in that case is shown in FIG. 19. The memory 42 has prestored therein a table of zoom speed set values corresponding to the type of battery shown in FIG. 5, a table of brightness set values corresponding to the type of battery shown in FIG. 8, a table of the strobe charging time set values corresponding to the type of battery shown in FIG. 11, a table of the strobe charging time set values corresponding to the type of battery and the battery voltage information shown in FIG. 14, and a table of the strobe charging time set values corresponding to the type of battery, the battery voltage information, and the temperature information shown in FIG. 17.

Based on the ON or OFF detected signal supplied from the battery detection switch 15 of the battery type determination mechanism 12 of the battery 2, the CPU 41 determines the type of battery housed in the battery box 11, determines whether or not the detected voltage Vbatt is greater than a predetermined threshold value Vth on the basis of the battery voltage information supplied from the battery voltage detection section 81, and further determines whether or not the detected temperature T is greater than a predetermined threshold value Tth on the basis of the temperature information supplied from the temperature detection section 91.

Based on these determination results, the CPU 41 reads the corresponding zoom speed set value (FIG. 5) by referring to the memory 42 and supplies the value to the zoom control section 43, so that the zoom speed of the zoom mechanism 45 is controlled; the CPU 41 reads the brightness set value (FIG. 8) and supplies the value to the screen brightness control section 61, whereby the brightness of the display screen 62 is controlled; and the CPU 41 reads the strobe charging time set value (FIG. 17) and supplies the value to the strobe charging control section 71, whereby the strobe charging time of the strobe mechanism 72 is controlled.

Furthermore, the CPU 41 may control only one of the operating conditions of the zoom speed of the zoom mechanism 45, the brightness of the display screen 62, and the strobe charging time of the strobe mechanism 72; may control any two of the operating conditions; or may control all three operating conditions. In that case, it is possible to freely switch between a case in which control is performed according to any one of the parameters of the type of battery, the battery voltage information, and the temperature information; a case in which control is performed according to any two of the parameters; and a case in which control is performed according to all three parameters.

Therefore, in the imaging device 1 of the present invention, based on the combination of the type of battery housed in the battery box 11 of the battery 2, the remaining level of the battery voltage, and the ambient temperature of the battery, it is possible to freely control any one, any two, or all three operating conditions from among the zoom speed of the zoom mechanism 45, the brightness of the display screen 62, and the strobe charging time of the strobe mechanism 72, allowing the full potential of the characteristics of the battery to be exploited.

In that case, a user may operate an input section (not shown) so as to freely switch operating conditions to be controlled.

In the foregoing, an example in which the present invention is applied to the imaging device 1 has been described. Alternatively, the present invention can be widely applied to other electronic devices which can be driven by the battery 2.

Furthermore, in the foregoing, whether the AA size batteries 21-1 and 21-2 are housed in the battery box 11 or whether the box-type battery 31 is housed therein is identified by the battery detection switch 15. Alternatively, a mechanism capable of identifying three or more types of batteries may be provided, so that each operating condition is controlled so as to exploit the full potential of the characteristics of various types of batteries.

Although the series of processes described in the foregoing can be performed by hardware, it can also be executed by software. In a case where the series of processes is performed by software, a program forming the software is installed from a recording medium into a computer incorporated into dedicated hardware or is installed into a general-purpose computer capable of executing various functions by installing various programs.

A recording medium for recording a program which is installed into a computer and which is placed in an executable state by the computer, as shown in FIG. 4, is formed of a packaged medium composed of the magnetic disk 51 (including a flexible disk), the optical disk 52 (including a CD-ROM (Compact Disk-Read Only Memory) or a DVD (Digital Versatile Disk)), the magneto-optical disk 53 (including an MD (Mini-Disc) (trademark)), or the semiconductor memory 54. Alternatively, the recording medium is formed of a Flash ROM, a hard disk drive, in which a program is temporarily or permanently recorded, etc. The recording of a program on a recording medium is performed using a wired or wireless communication medium, for example, a network such as a public network, a local area network, or the Internet, or a digital satellite broadcast, via interfaces such as a router, a modem, etc., as necessary.

In this specification, steps forming a program recorded on a recording medium may be executed chronologically according to the written orders. However, they do not have to be executed chronologically, and may be executed concurrently or individually.

INDUSTRIAL APPLICABILITY

As has thus been described, according to the present invention, it is possible to identify the type of battery loaded into an electronic device.

According to the present invention, it is possible to identify the type of battery loaded into an electronic device, making it possible to change the operating conditions of the electronic device according to the type of battery.

The invention claimed is:

1. An electronic device driven by a power supply unit, said electronic device comprising:
   obtaining means for obtaining a signal for identifying a type of battery, which is supplied from said power supply unit;
   determination means for determining said type of battery on the basis of said signal obtained by said obtaining means;
   voltage detection means for detecting the voltage of said battery, which is supplied from said power supply unit;
   temperature detection means for detecting the ambient temperature of said battery, which is supplied from said power supply unit; and
   control means for controlling zoom speed of said electronic device, brightness of the screen of said electronic device and charging time of a strobe of said electronic device on the basis of the determination result by said determination means, the voltage detection result by said voltage detection means and the temperature detection result by said temperature detection means.

2. An electronic device according to claim 1, further comprising:
   storage means for storing condition information for controlling the zoom speed of said electronic device, the brightness of the screen of said electronic device and the charging time of the strobe of said electronic device,
   wherein said control means reads said condition information stored in said storage means on the basis of the determination result by said determination means, and controls the zoom speed of said electronic device, the brightness of the screen of said electronic device and the charging time of the strobe of said electronic device on the basis of said read condition information.

3. A control method for controlling an electronic device driven by a power supply unit, said control method comprising:
   an obtainment control step of controlling the obtainment of a signal for identifying a type of battery, which is supplied from said power supply unit;
   a determination step of determining said type of battery on the basis of said signal whose obtainment is controlled in the process of said obtainment control step;
   a voltage detection step of detecting the voltage of a battery, which is supplied from said power supply unit;
   a temperature detection step of detecting the ambient temperature of said battery, which is supplied from said power supply unit; and a control step of controlling zoom speed of said electronic device, brightness of the screen of said electronic device and charging time of a strobe of said electronic device on the basis of the determination result in the process of said determination step, the voltage detection result in the process of said voltage detection step and the temperature detection result in the process of said temperature detection step.

4. A recording medium having recorded there on a computer-readable program for controlling an electronic device driven by a power supply unit, said program comprising:

an obtainment control step of controlling the obtainment of a signal for identifying a type of battery, which is supplied from said power supply unit;

a determination step of determining said type of battery on the basis of said signal whose obtainment is controlled in the process of said obtainment control step;

a voltage detection step of detecting the voltage of a battery, which is supplied from said power supply unit;

a temperature detection step of detecting the ambient temperature of said battery, which is supplied from said power supply unit; and a control step of controlling zoom speed of said electronic device, brightness of the screen of said electronic device and charging time of a strobe of said electronic device on the basis of the determination result in the process of said determination step, the voltage detection result in the process of said voltage detection step.

5. A program embodied in a computer-readable medium to control a processor to implement a method by which an electronic device that is driven by a power supply unit is controlled, said program consisting of instructions to control said processor to perform the method comprising:

an obtainment control step of controlling the obtainment of a signal for identifying a type of battery, which is supplied from said power supply unit;

a determination step of determining said type of battery on the basis of said signal whose obtainment is controlled in the process of said obtainment control step;

a voltage detection step of detecting the voltage of a battery, which is supplied from said power supply unit;

a temperature detection step of detecting the ambient temperature of said battery, which is supplied from said power supply unit; and a control step of controlling zoom speed of said electronic device, brightness of the screen of said electronic device and charging time of a strobe of said electronic device on the basis of the determination result in the process of said determination step, the voltage detection result in the process of said voltage detection step and the temperature detection result in the process of said temperature detection step.

* * * * *